US009669856B2

(12) United States Patent
Hunt

(10) Patent No.: US 9,669,856 B2
(45) Date of Patent: Jun. 6, 2017

(54) ACCESSORY TRAY FOR SHOPPING CART

(71) Applicant: Richard John Hunt, Caldwell, ID (US)

(72) Inventor: Richard John Hunt, Caldwell, ID (US)

( * ) Notice: Subject to any disclaimer, the term of this patent is extended or adjusted under 35 U.S.C. 154(b) by 0 days.

(21) Appl. No.: 15/159,373

(22) Filed: May 19, 2016

(65) Prior Publication Data
US 2016/0339938 A1     Nov. 24, 2016

Related U.S. Application Data

(60) Provisional application No. 62/165,036, filed on May 21, 2015.

(51) Int. Cl.
*B62B 3/14* (2006.01)
*B62B 3/00* (2006.01)

(52) U.S. Cl.
CPC ............ *B62B 3/1468* (2013.01); *B62B 3/001* (2013.01); *B62B 3/144* (2013.01)

(58) Field of Classification Search
CPC ........ B62B 3/1468; B62B 3/1436; B62B 9/26
See application file for complete search history.

(56) References Cited

U.S. PATENT DOCUMENTS

| 4,156,318 A | 5/1979 | Economy |
| 4,643,280 A | 2/1987 | Hensley |
| D352,588 S * | 11/1994 | Orphan .......................... D34/27 |
| D435,196 S | 12/2000 | Gregor et al. |
| 6,453,588 B1 * | 9/2002 | Lykens ..................... G09F 7/04 |
| | | 280/33.992 |
| 7,134,674 B2 | 11/2006 | Frommherz |
| D583,123 S | 12/2008 | Cassin |
| 8,056,909 B2 | 11/2011 | Burdwood et al. |
| 8,313,114 B1 | 11/2012 | Aron |
| 8,534,520 B1 | 9/2013 | Liparoti |
| D714,012 S | 9/2014 | Fredendall et al. |
| 2004/0080129 A1 * | 4/2004 | Myers ................... B62B 3/1428 |
| | | 280/33.992 |

* cited by examiner

*Primary Examiner* — Erez Gurari
(74) *Attorney, Agent, or Firm* — Pedersen and Company, PLLC; Ken J. Pedersen; Barbara S. Pedersen

(57) ABSTRACT

An accessory tray is connected to, or extends integrally from, a shopping cart handle and extends a limited distance forward from the handle. The tray extends forward above, but not significantly interfering with, the child-seat area of the cart. Preferably, the forward extremity is not directly connected or attached to the cart, but rather the tray is cantilevered from its rear end/edge fixed to/at the handle and extends otherwise unconnected forward from the handle. A forward tray portion may rest on, or be close to, an upper portion/end of the cart rear wall. The preferred tray is substantially planar, featuring a single, flat platform with an upending rim, wherein no part extends above said top level of the handle. The tray remains in place for nesting of multiple carts, and is received in a space between nested portions of the cart to which it is connected.

14 Claims, 15 Drawing Sheets

ACCESSORY TRAY FOR SHOPPING CART

This application claims benefit of Provisional Application Ser. No. 62/165,036, filed May 21, 2015, and entitled "Shopping Cart Shopping List Holder", the entire disclosure of which is incorporated herein by this reference.

BACKGROUND OF THE INVENTION

Field of the Invention

This invention relates to accessories for shopping carts, and more specifically, a tray that has a slim profile and effective location on a shopping cart that does not interfere with the user reaching the contents of the cart or with operation and storage of the cart. The tray is preferably connected to the cart by attachment to the cart handle, most preferably the central underside of the handle. The attachment location and the size and shape of the tray provide a convenient, moderately-sized platform for placement of, and convenient access to, the cart-user's important personal items, such as a cell phone, keys, and shopping list.

Related Art

Trays and holders have been disclosed in the patent literature for use with conventional grocery carts. Such devices include U.S. Pat. No. 4,156,318 (Economy), U.S. Pat. No. 4,643,280 (Hensley), D435,196 (Gregor et al.), U.S. Pat. No. 7,134,674 (Frommherz), D583,123 (Cassin, III), U.S. Pat. No. 8,056,909 (Burdwood et al.), U.S. Pat. No. 8,313,114 (Aron), U.S. Pat. No. 8,534,520 (Liparoti), and D714,012 (Fredendall et al.). These prior art approaches are complex, and/or interfere with the user's access to items in the cart or with a child sitting in the child-seat of the cart. For example, many of these devices attach to multiple pieces of the cart, for example, multiple bars/rods of the cart, and/or are removably lowered down onto, and support by, said multiple pieces of the cart. Many of these devices protrude a significant distance upward from the level of the handle and a significant distance upward from a plane extending from the handle to the rear transverse bar that is typically an upper portion or upper end of the cart rear wall, which the child in the "child-seat area" faces. Further, many of these devices tend to extend forward from the cart handle and across a substantial portion of the child-seat area, blocking or interfering with convenient placement of a child or items in that area.

There is still a need for a simpler, more compact accessory tray that prevents the common problem of personal items falling through the cart to the floor, and frequently becoming lost or even stolen, and the problem of maintaining easy and close access to those personal items by the user. There is a need for a tray that does not interfere with the use of the cart and the user's ability to conveniently reach the items and/or the child in the child-seat of the cart. The present invention solves one, multiple, or all of these needs, as will be further apparent from the following description and the drawings.

SUMMARY OF THE INVENTION

The present invention comprises an accessory tray that is connected to, or extends integrally from, a shopping cart handle and extends a limited distance forward from the handle. The rearmost extremity of the tray preferably is connected to or integral with only the handle and the tray extends forward so that its forward extremity is above the child-seat area of the cart, but not so far forward that it interferes with the child-seat area. Preferably, the forward extremity is not directly connected or attached to the cart, so that the tray is cantilevered from its rear end/edge fixed to/at the handle and extends otherwise unconnected forward from the handle. Preferably, the tray extends from the handle to place the tray forward extremity generally over an upper end of a rear wall of the shopping cart, so that the tray extends over the handle space between the handle and said rear wall but not over any, or at least not a significant portion, of the child-seat portion.

The connection, or integral fixing, of the rearmost extremity to the handle is preferably to the bottom of the handle, and/or the bottom and sides of the handle, in about the center of the handle, to allow the cart-user to place a hand on each side of the tray for normal "driving" of the cart. While various types of connection or integral fixing are possible, it is preferred that the tray is manufactured as a separate article and then connected/fixed to the handle of a cart, for example, by adhesive, glue, screws, ties, straps, and/or hook and loop fastener, or other fasteners. Alternatively, the tray may be connected to a portion of the handle other than the bottom or bottom and sides, but it is desired that a tray thus-connected has a profile that does not extend above the handle very far.

The tray preferably is a substantially planar device, and may comprise a flat platform, a rim extending upward a short distance around multiple sides of the platform, and a connection means rearward of the platform for said connection to the handle. The connection means may be a simple semi-cylindrical, or otherwise curved, connection portion, of a diameter/shape that generally matches the outer circumference of the cart handle. Said connection may receive the handle and be adhesively fixed to the handle so that the tray does not rotate, slide, or otherwise move relative to the handle. Such an adhesive connection may be used to connect the preferred tray to existing carts to enhance convenient use.

Certain embodiments of the platform may be called a low-profile tray, with the entire platform of the tray and the entire portion of the tray rearward of the platform being 1 inch or less in height. The low-profile may be enabled and enhanced by the tray being connected only to the bottom of the handle, and by the tray platform having no deep protrusions or tall protrusions. It is desired that no part of the tray extends more than about ½ inch above the top level of the handle, or more preferably no more than about ¼ inch above the top level of the handle. A tie or other fastener may extend about ¼ inch or less above the top level of the handle, for example, the ties in FIGS. 17 and 18 will extend about 1/16-¼ inch above the handle, but one may understand that this will not interfere with the user reaching forward over the tray or with nesting of the cart with other carts. Most preferably, no part extends above said top level of the handle.

The tray may be shaped, sized and positioned so that it does not prevent or interfere with, and does not need to be removed or moved for, the nesting of multiple carts. For example, the preferred tray allows the conventional pivoting/folding of rear wall and child-seat portions of conventional grocery carts, for nesting of the carts, and is not impacted or pushed or even contacted by any of the pivoting/folding parts to an extent that harms the tray or interferes with said nesting. In the nested condition, the tray remains in its original, installed position, with the front portion/edge of the tray being between the top bar/edge of the rear wall portion of the cart and the top bar/edge of the child-seat back, which rear wall portion and child-seat backs have pivoted/folded from their in-use positions to the nested positions. Similarly, when the carts are un-nested, said rear wall portion and child-seat back pivot/unfold and, hence, move away from the tray with ease and without significant force or impact on the tray.

Preferably, the platform is solid and continuous, except for optional drain apertures. Alternatively, the platform may have many apertures, for example, mesh or screen apertures. Preferably, all apertures are small enough that the user's objects will not fall through, or get stuck or lodged in, the apertures, for example, less than ½ inch in diameter, or in width and depth.

DESCRIPTION OF THE PREFERRED EMBODIMENTS

Figure 1:
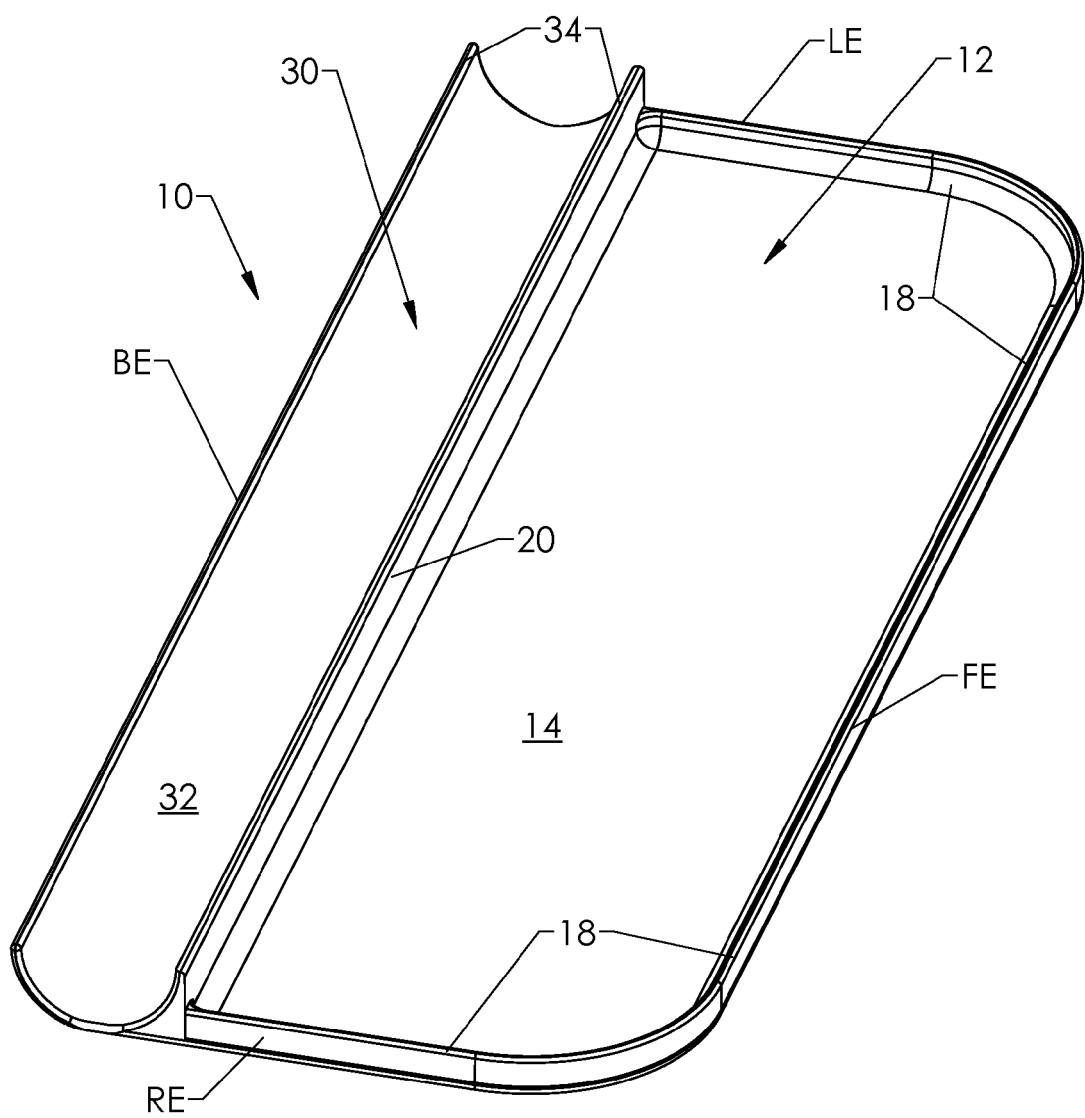
FIG. 1 is a top, right-end perspective view of one embodiment of the invented accessory tray for a shopping cart.
Figure 2:
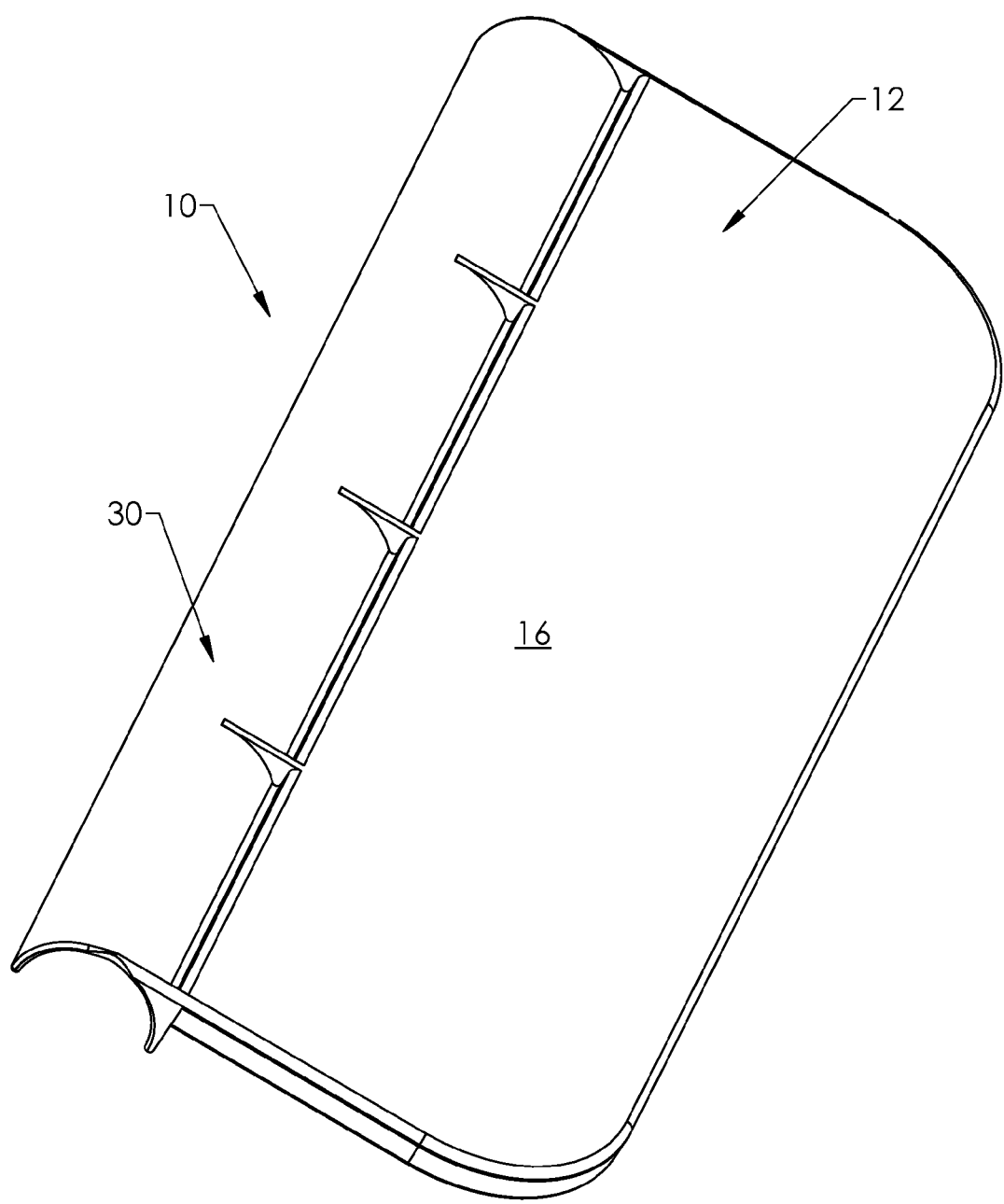
FIG. 2 is a bottom perspective view of the tray of FIG. 1.

Referring to the Figures, there is shown one, but not the only, embodiment of the invented accessory tray for use with a shopping cart.

FIGS. 1-8 illustrate the preferred tray 10 separate from, and before installation on, a shopping cart. These figures illustrate the generally or substantially planar form of the tray 10, and the relative dimensions that include the tray being longer (from right end/extremity RE to left end/extremity LE) than it is wide (from the front extremity FE to the rear/back extremity BE). Much smaller than the length and the width is the thickness(es) (from the bottom extremity BE to the top extremity TE1 of the platform portion and the top extremity TE2 of the connection portion). The relatively small thicknesses provide the tray's thin profile, which results in the tray's low-profile when installed on a shopping cart.

FIGS. 1-8 illustrate that the major portion of the tray 10 is a platform portion 12 at the front of the tray, and the minor portion of the tray 10 is the relatively smaller connection portion 30 at the rear of the tray. Platform portion 12 has a planar or substantially planar top surface 14, and a bottom surface 16 that is preferably but not necessarily planar or substantially planar. The platform portion 12 is surrounded on multiple sides by an upending rim 18, for helping to contain items on the platform top surface 14 and/or for giving rigidity to the platform portion 12. In this tray 10, the rim 18 upends around three sides of the tray, while a forward upending wall 20 of the connector portion 30 serving at the upending rim on the fourth side of the planar top surface 14.

The connector portion 30 comprises an upwardly facing semi-cylindrical surface 32 that extends along the entire, or substantially the entire, width from right to left end of the tray 10. This surface 32 is made to have the generally the same, or the same, diameter as a conventional shopping cart handle 110 outer surface. This way, the connection portion 30 can be raised up to the bottom of the cart handle and adhesively attached to said bottom and preferably also to portions of the front and rear of the handle. For example, if the connector portion 30 forms a half-cylinder by extending 180 degrees, the surface 32 will contact and be adhesively connected to 180 degrees of the circumference of the handle. A different amount of curvature may be used, for example, less than 180 degrees or more than 180 degrees, but 170-190 degrees is preferred. In the case of greater than 180 degrees, the connector portion 30 may require snapping onto the handle, for example. It is preferred that no part of the tray but the rear connection portion, generally forming or disposed at the rear edge of the tray, will be fixed or directly connected to the cart; other portions, such as the bottom surface 16 and the front rim 18' may contact the cart but they are preferably not fixed or directly connected to the cart.

Figure 5:
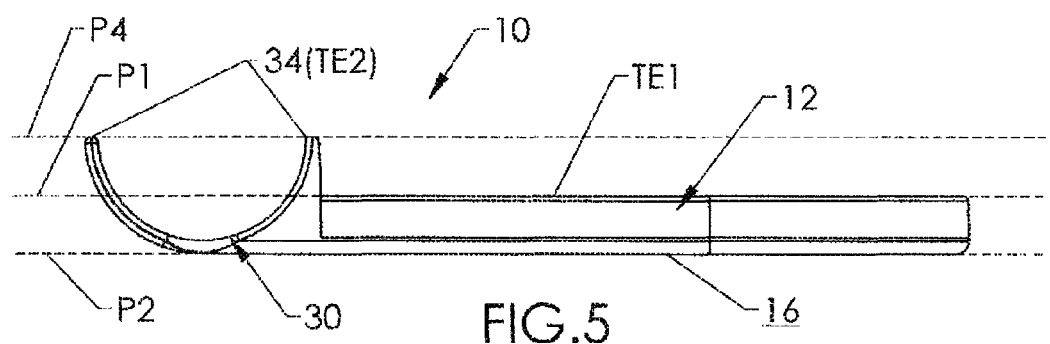
FIG. 5 is a right end view of the tray of FIGS. 1-4, wherein the left end view would be a mirror image of FIG. 5.
Figure 6:
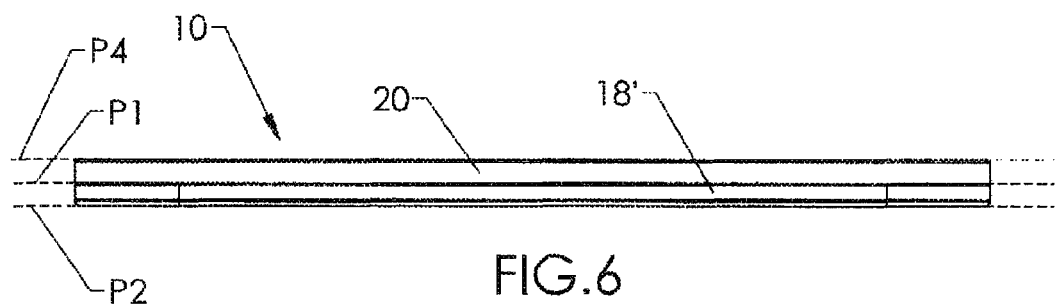
FIG. 6 is a front view of the tray of FIGS. 1-5.

It may be noted from FIGS. 5 and 6 that the top of the rim 18, which is preferably the top extremity TE1 of the platform portion 12, may be said to lie on, and define, a plane P1, or "a top plane of the platform portion". The bottom surface 16, which is preferably the bottom extremity BE of the platform portion 12 and the entire tray 10, may be said to lie on, and define, a plane P2, or "a bottom plane of the platform portion" or "a bottom plane of the tray". Plane P1 and plane P2 are preferably parallel, and only a small distance apart so that the thickness of the platform portion 12 is, for example, less than 1 inch, more preferably less than ½ inch, or most preferably about ¼ inch.

The plane P3 of platform top surface 14 is preferably parallel to the top plane P1 of the platform portion 12 and also preferably parallel to the bottom plane P2 of the platform portion 12. Bottom plane P2 and plane P3 are only a small distance apart so that the thickness of the platform portion excluding the rim 18 is, for example, preferably less than ½ inch, more preferably less than ¼ inch, and most preferably about ⅛ inch.

Figure 7:
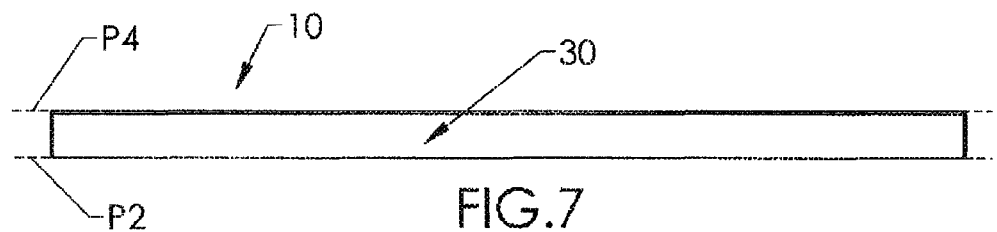
FIG. 7 is a rear view of the tray of FIGS. 1-6.

The top edges 34 of the connector portion 30 reach up higher than the rim 18 of the platform portion 12, and reach to, and define, a plane P4 that is preferably parallel to planes P1, P2, and P3. Note that FIGS. 6 and 7 are reduced in scale compared to FIG. 5, to allow all three figures to be arranged on the page.

Figure 3:
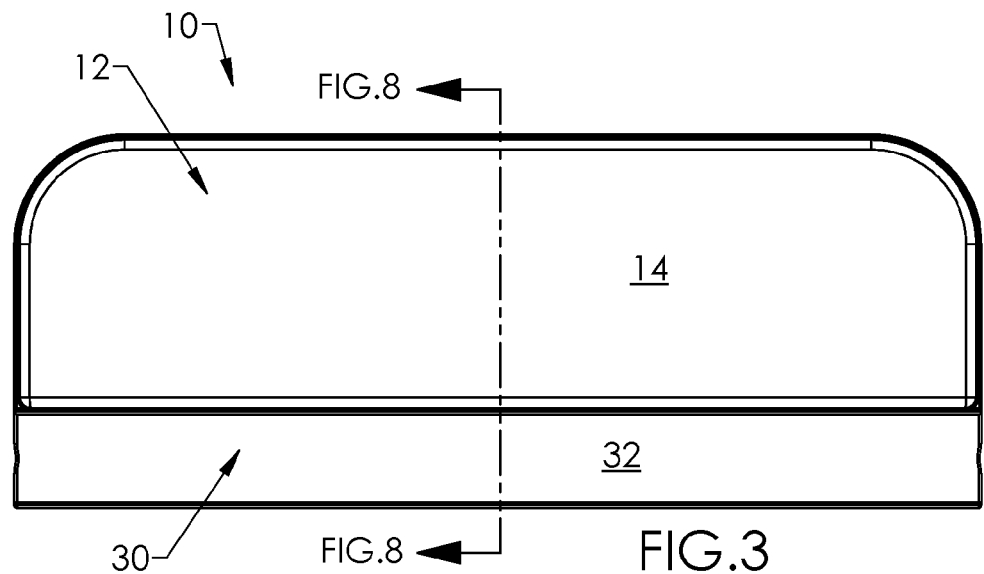
FIG. 3 is a top view of the tray of FIGS. 1 and 2, wherein the front edge and rear edge of the tray are toward the top and bottom of the sheet, respectively, and the right end and left end of the tray are toward the right and left edges of the sheet, respectively.
Figure 4:
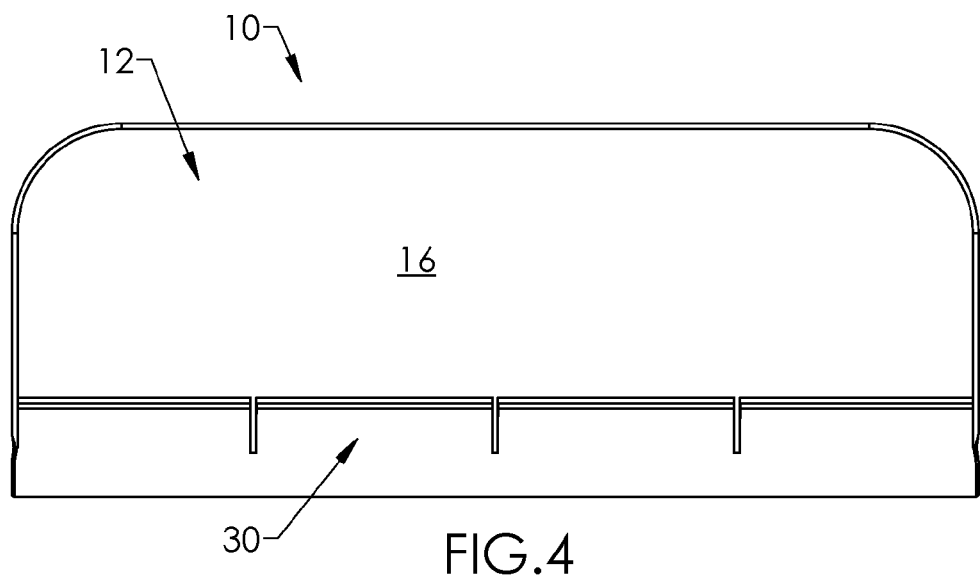
FIG. 4 is a bottom view of the tray of FIGS. 1-3.
Figure 8:
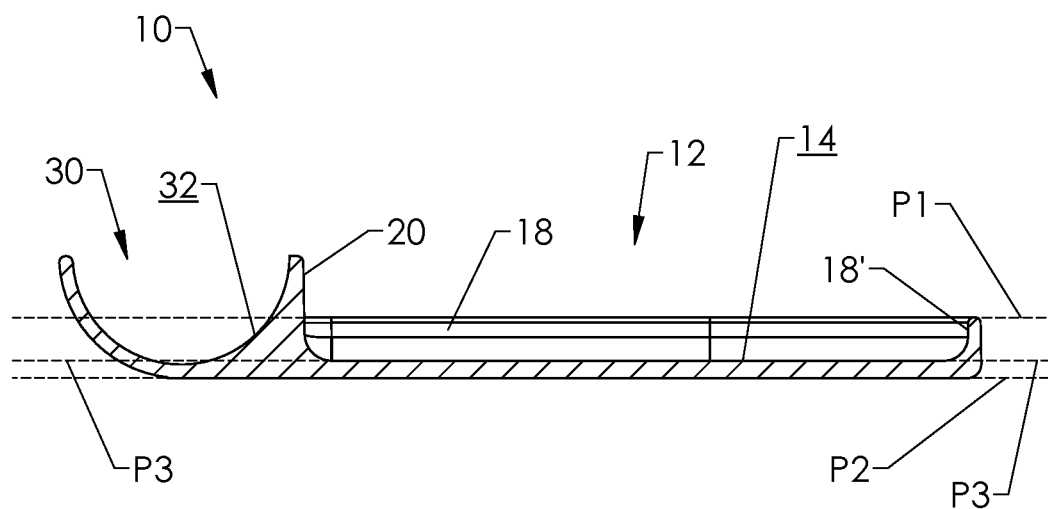
FIG. 8 is a cross-sectional view of the tray of FIGS. 1-7, viewed along the line 8-8 in FIG. 3.
Figure 9:
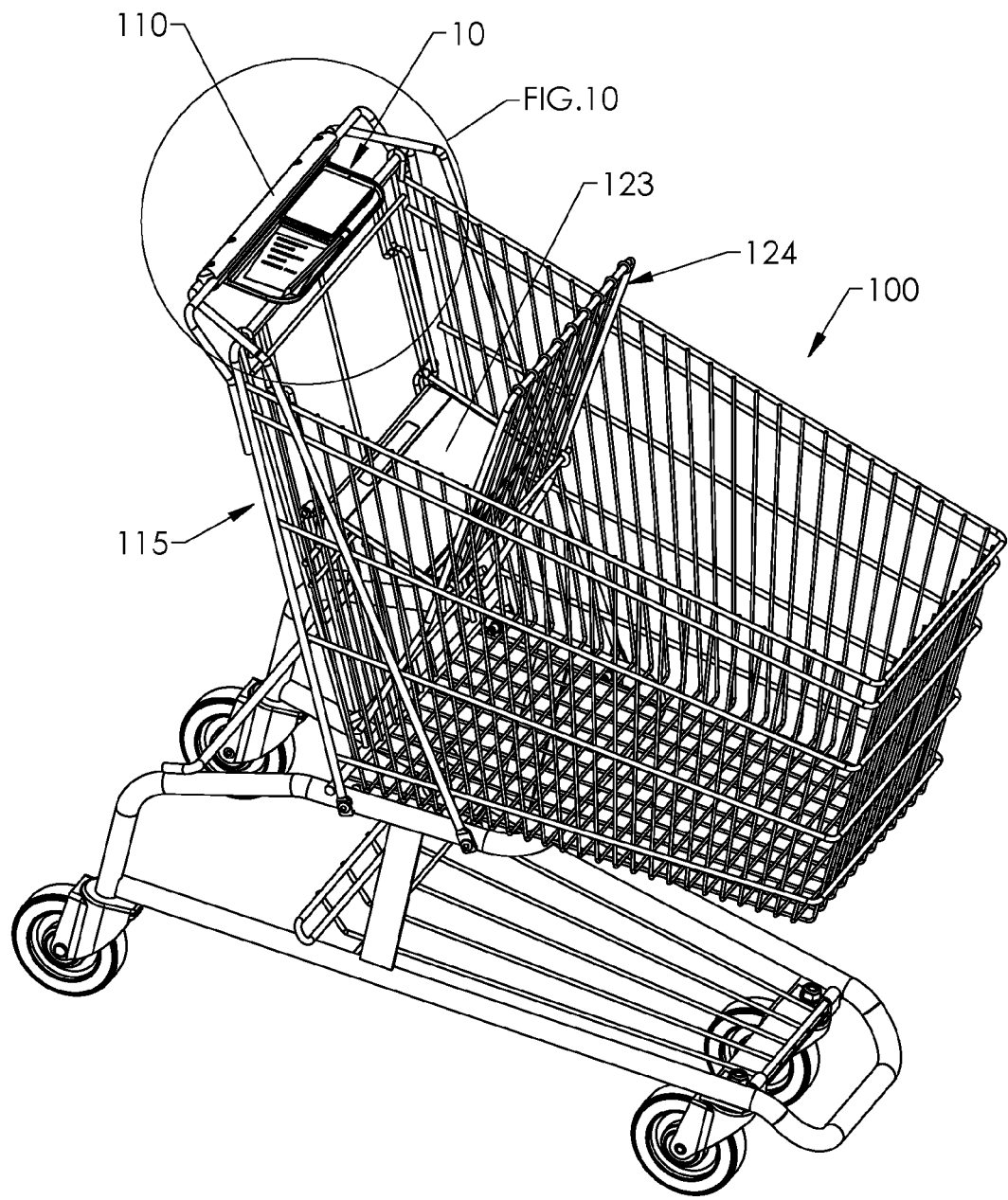
FIG. 9 is a right side perspective view of an example shopping cart in the in-use configuration and holding the tray of FIGS. 1-8, with several personal items resting on the platform of the tray.
Figure 10:
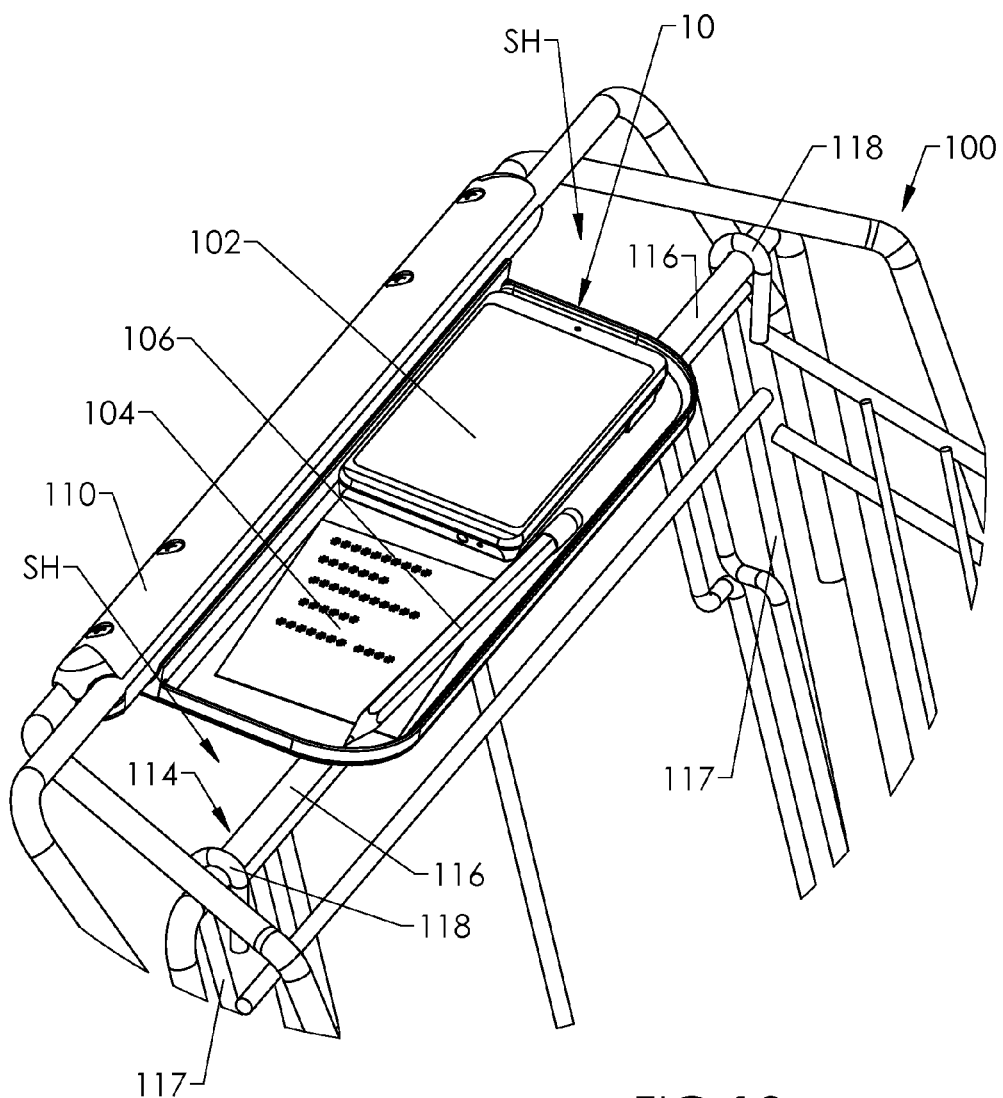
FIG. 10 is a detail view corresponding to the circled portion of FIG. 9, providing an enlarged view of the tray and personal items.
Figure 11:
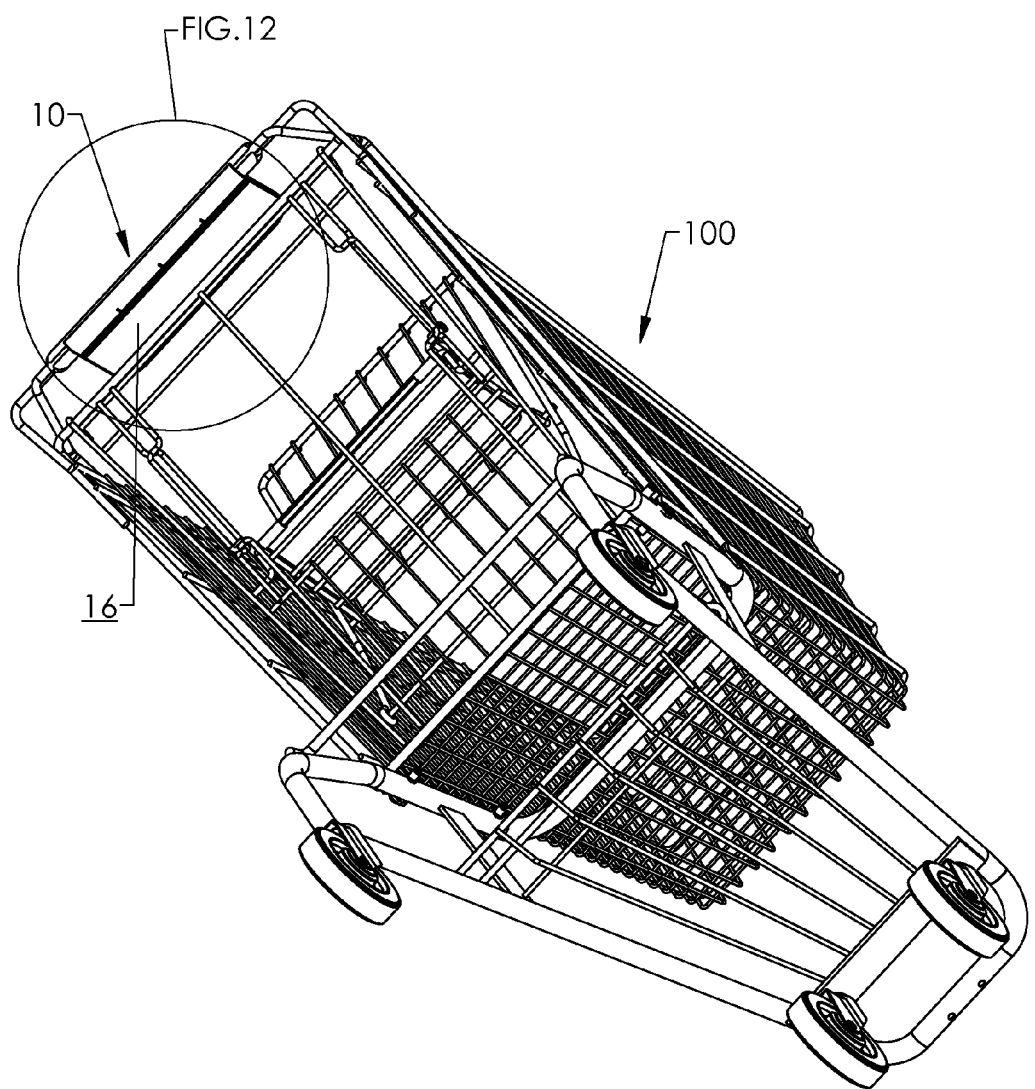
FIG. 11 is a bottom perspective view of the shopping cart of FIG. 9, still in the in-use configuration, wherein the bottom of the tray may be seen.
Figure 12:
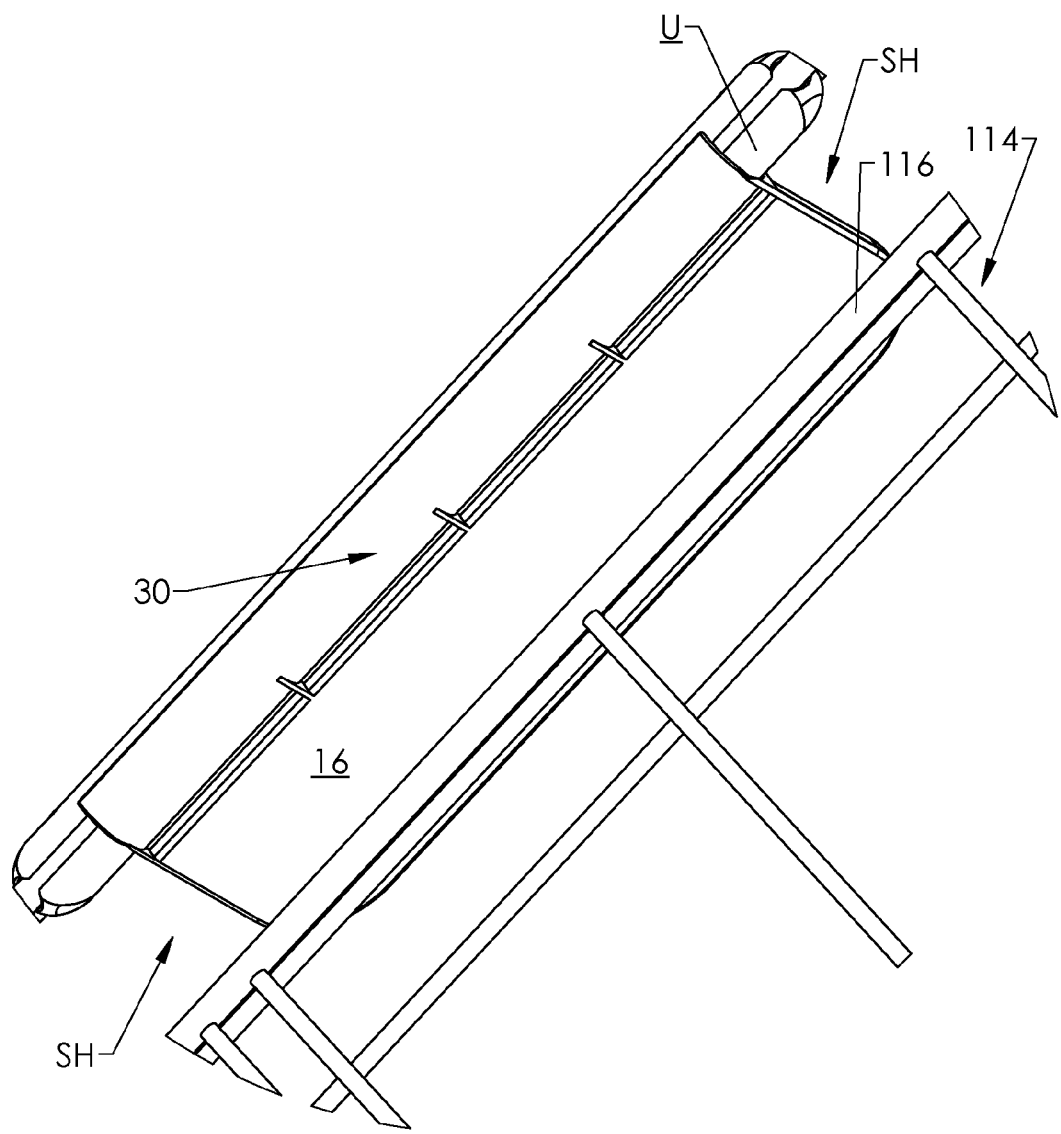
FIG. 12 is a detail view corresponding to the circled portion of FIG. 11, providing an enlarged view of the bottom of the installed tray.
Figure 13:
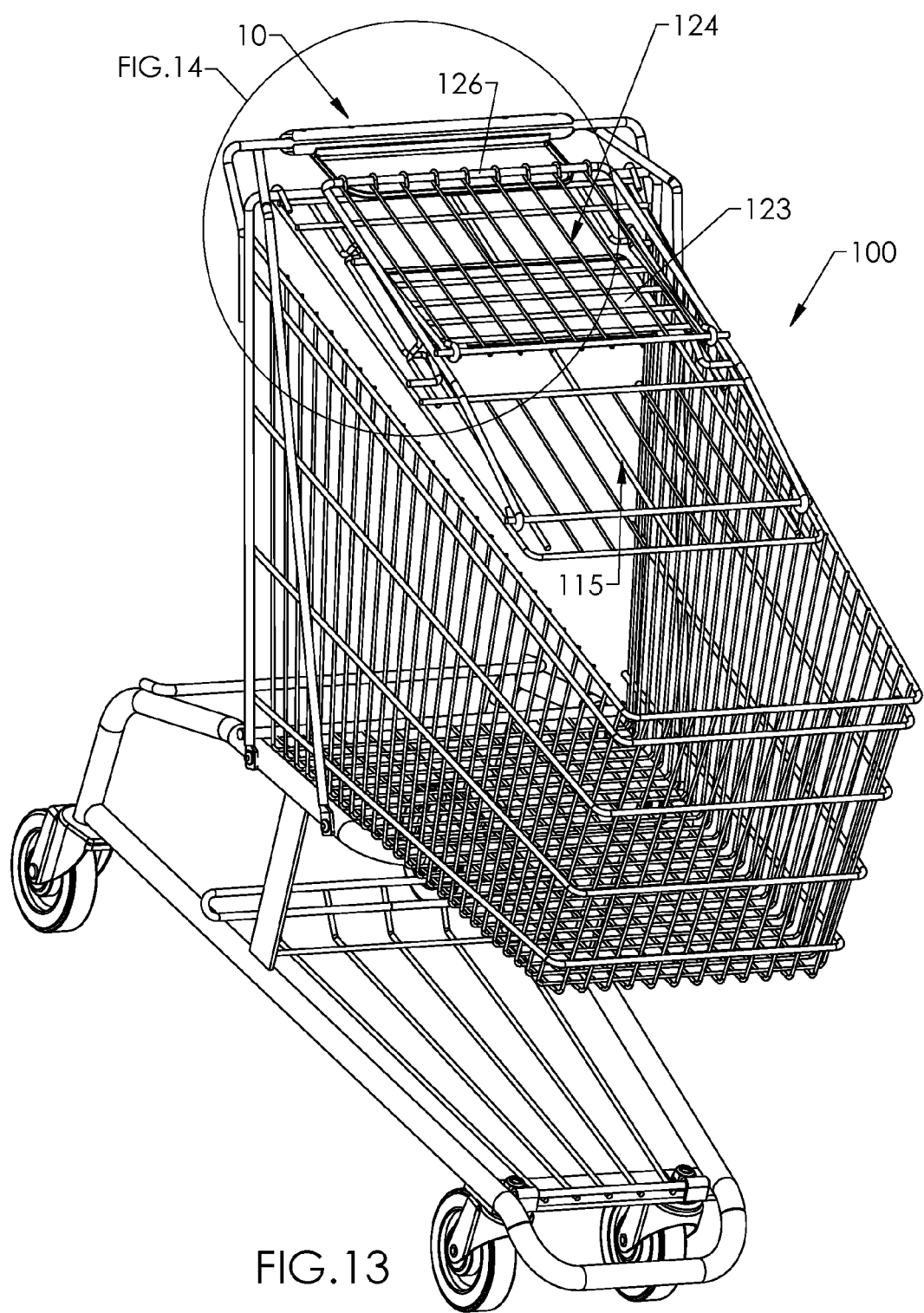
FIG. 13 is a front, top perspective view of the shopping cart of FIGS. 9-12, with the tray installed, but wherein the shopping cart rear wall and child-seat portions have been pivoted/folded to a nesting configuration, so that another cart can be inserted through the rear opening into the interior space of the cart for the nesting of multiple carts.
Figure 14:
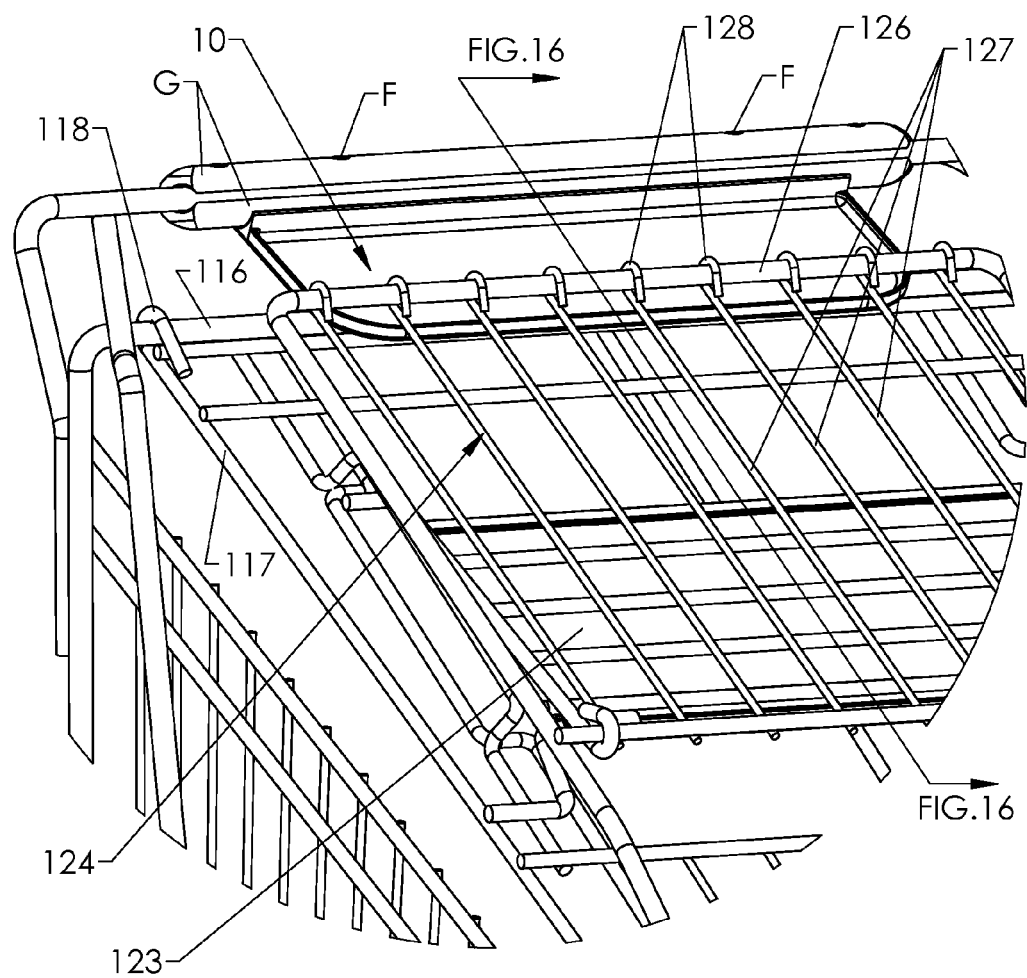
FIG. 14 is a detail view corresponding to the circled portion of FIG. 13, providing an enlarged view of the tray, wherein the tray has not moved relative to the handle but the tray front portion/edge is now between portions of the pivoted rear wall and the folded child-seat.
Figure 15:
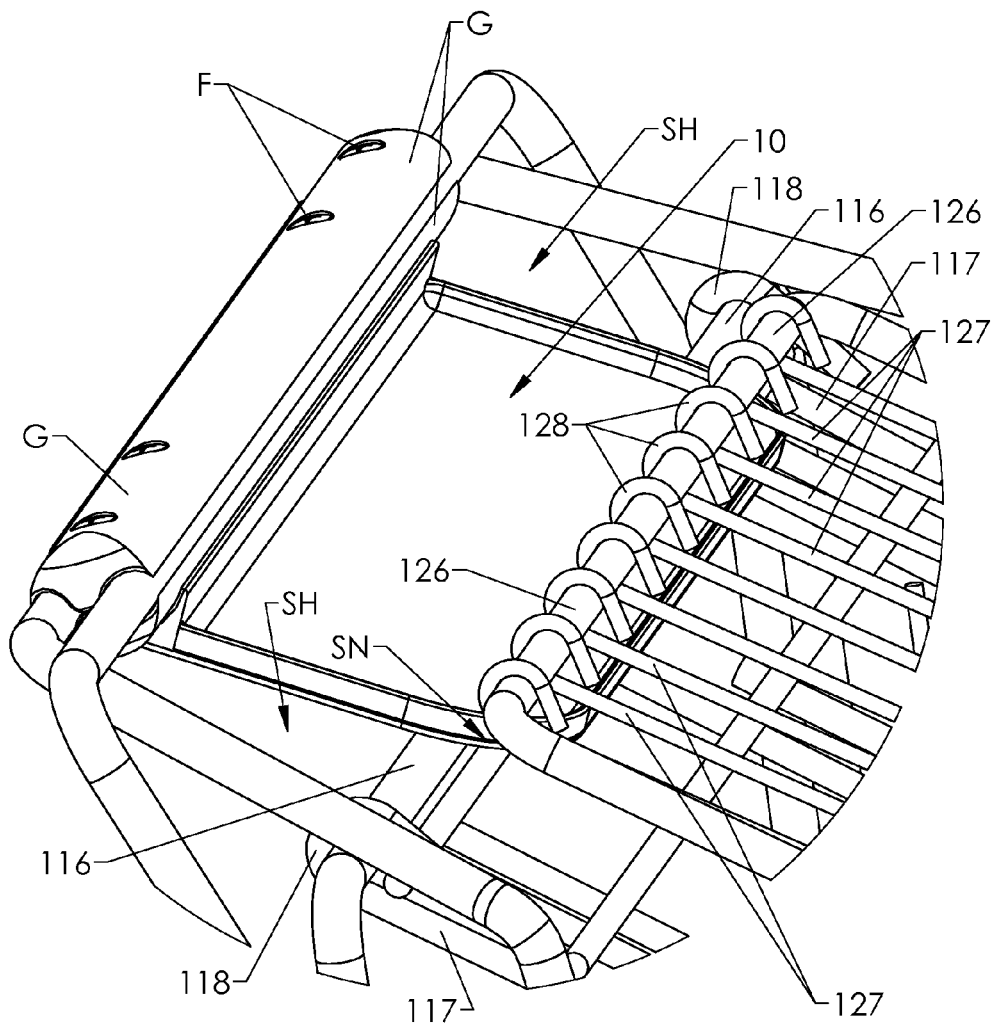
FIG. 15 is a right-side perspective detail view of the tray and the nesting-configuration cart of FIGS. 13 and 14.

FIG. 8 is a cross-section of the tray as viewed along the line 8-8 in FIG. 3. In this figure, one may see that planar top surface 14 of the platform portion 12 is planar and continuous, lying on, and defining, plane P3. Alternatively, the platform portion 12 may include apertures, such as liquid drain apertures, but they should be small enough that items do not fall into or through the apertures, for example, any apertures should be less than ½ inch, and preferably less than or equal to ⅜ inch, in diameter, or in width and depth. It is preferred that the top surface 14 is continuous (100 percent continuous, and no apertures/holes) or substantially continuous (90-99.9 percent continuous, and 0.1-10 percent apertures/holes such as the less than ½ inch drain apertures/holes described herein). It is preferred that the top surface does not comprises recesses or protrusions, for example, no compartments or depressions, as the small size of the top surface 14 is most effective when it is planar, substantially or entirely continuous, and simple. This way, a user can place items on the top surface 14, even stacked or overlapping, without fitting the items into particular compartments or depressions. This way, no elongated or sharp items are held vertically, and so danger of the items gouging, cutting, or poking, a child or the user is minimized or eliminated. Most items will be placed on the top surface 14 within the perimeter formed by the rim 18, but some items may extend horizontally over and beyond the rim 18. One or more of the most frequently-placed items, for example keys, cell phone, shopping list, and/or wallet, will fit well on the platform top surface 12.

The tray 10 is preferably molded from polymer, but it may alternatively be made from other durable and preferably weather-resistant material(s). The tray 10 may be solid, but, alternatively may have hollow portions. Preferably, the tray is a single piece, and has no hinge, no moving parts, and no disconnectable portions.

FIGS. 9-12 illustrate an in-use position of the tray 10 installed on an example of a conventional shopping cart 100 in an in-use configuration. A personal digital device or phone 102, shopping list 104, and a pencil 106 rest on the platform portion 12. The connection portion 30 is fixed to the handle 110 of the cart by the handle being cradled in the connection portion 30, with adhesive (not shown) fixing the semi-cylindrical surface 32 to the underside surface U (bottom, and lower portions of the front and rear side) of the handle 110.

From the fixed connection to the handle, the platform portion 12 extends forward over the space between the handle and the upper end 114 of the rear wall 115, which space may be called a handle space SH. The platform portion 12 extends to, or slightly forward beyond, the upper end 114 of the rear wall 115 of the cart 100, so that the front side or front extremity of the tray/platform may be described as being "generally over the upper portion/end of the rear wall". "Generally over the upper portion/end of the rear wall" may include extending forward of upper end 114 only 2 inches or less, and more preferably 1 inch or less. Preferably, the platform portion does not extend over the child-seat seat flap, or at least not significantly over the child-seat seat flap. Further, in the in-use configuration of the shopping cart, portrayed in FIGS. 9-12, the tray and its platform portion do not reach, contact, connect to, or rest on the child-seat back, whereas, in the nesting configuration of the shopping cart, part of the platform portion (the front) will be underneath the child-seat back upper portion/end that will typically rest on said part of the platform portion.

Said upper end 114 typically comprises a first horizontal bar 116, one or more vertical bar 117 top ends (or loop ends) 118 that loop around horizontal bar 116, a second horizontal bar 120, and secondary vertical bars having top ends (or loop ends) 122 that loop around second horizontal bar 120. Typically, first horizontal bar 116 is higher than second horizontal bar 120 and loop ends 122, and loop ends 118 are spaced far to the right and left, so that the bottom surface 16 rests only on horizontal bar 116. In this condition, some of the weight of the tray and its contents may be supported by said horizontal bar 116. When the bottom surface 16 contacts said bar 116, said contact is not fixing or attachment of the tray to said bar 116, but rather simply resting on the bar 116. Said resting on the bar 116 preferably comprises only a small amount of weight/force so that the bar 116 and upper end 114 still may be moved relative to the tray without harming the tray or the connection of the tray to the handle, and without disrupting/changing the position of the tray. For example, when the rear wall 115 of the cart pivots/folds for nesting with other carts, said upper end 114 will rotate relative to the tray without significant interference and without disrupting the tray position or connection to the handle.

Alternatively, in the in-use position, the bottom surface 16 may be slightly spaced from said bar 116 and from the other portions of upper end 114 of the rear wall 115. In this condition, the connection portion 30 being fixed to the handle will be the only support mechanism for the tray and its contents.

FIGS. 13-16 illustrate a nesting configuration of the shopping cart 100 and the resulting position of the tray 10 relative to the cart elements. While only one cart 100 is shown in these drawings, it will be easily understood by those familiar with shopping carts how multiple carts in the portrayed configuration may be nested together for storage and for taking up far less room during storage.

To enter the nesting configuration, the child-seat seat flap 123 and child-seat back 124 (see FIG. 9) are pivoted to collapse the child-seat rearward, against the rear wall 115, and the rear wall 115 is pivoted forward at its bottom end, bringing the child-seat (123 and 124) with it, to enter the generally horizontal position shown in FIGS. 13-16. This opens the rear of the cart to allow access into the interior space of the cart, for receiving the front end of a second cart. The result of this movement into the nesting configuration is that the child-seat (123 and 124) and the rear wall 115 are near each other and generally but not necessary exactly parallel.

In the nest configuration, a front portion of the tray, specifically about the front ⅓-⅕ of the platform portion 12, is received between the upper end 114 of the rear wall 115 and the upper end of the child-seat back 124. To enter this position, the tray 10 has not moved relative to the handle 110, for example, it has not pivoted or slid relative to the handle 110 as it remains fixed to the handle. The rear wall 115 and the child-seat back 124 have moved relative to the each other and relative to the tray 10. Specifically, the rear wall has pivoted, typically on horizontal bar 116, so its upper end 114 is generally horizontal underneath the tray platform portion 12. Typically, this occurs by the vertical bars 136 pivoting on the horizontal bar 116, and the tray remains resting (or slightly spaced from, in certain embodiments) on the horizontal bar 116 and still extending across the handle space SH (see FIG. 15). Also, the child-seat back 124 has pivoted forward above the platform portion 12 so its upper end is generally horizontal above the tray 10. Said upper end of the child-seat back 124 may be described as an upper horizontal bar 126, and vertical bar 127 top ends 128 that loop around bar 126.

Figure 16:
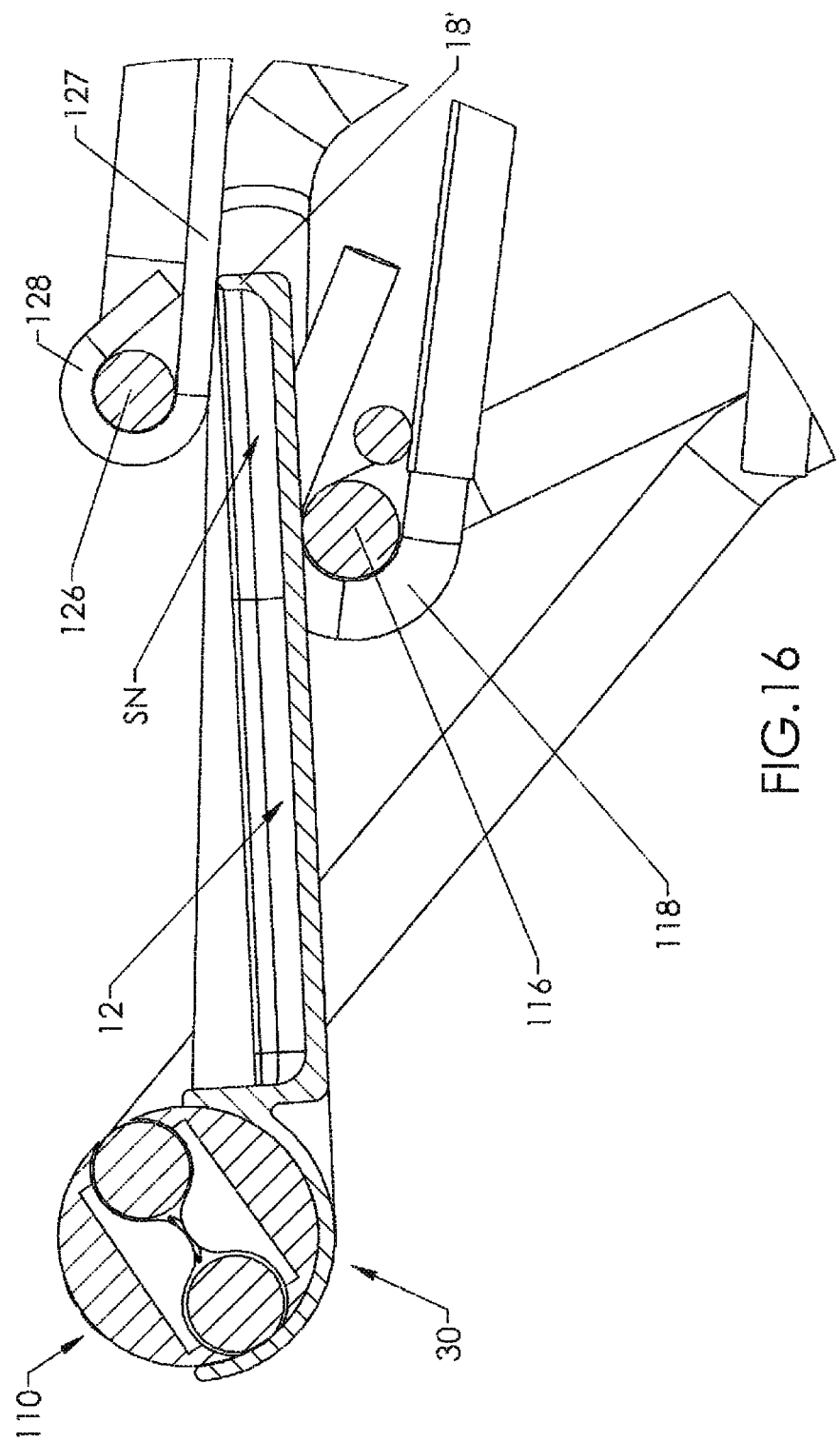
FIG. 16 is a cross-sectional view of the tray and the nesting-configuration cart of FIGS. 13-15, viewed from the line 16-16 in FIG. 14.

The position of the tray 10 in the nesting configuration is best shown by the cross-sectional view in FIG. 16. In that figure, one may see the platform portion 12 resting on (or very near to) the horizontal bar 116 of the upper end 114 of the rear wall 115. One may also see the upper end of the child-seat resting on (or very near to) the platform portion 12, specifically in this embodiments, the top ends 128 and/or the vertical bars 127 resting on the front-side rim 18' of the platform portion 12. Thus, FIG. 16 illustrates how the tray extends into space SN (which may be called a "nesting space for the tray front side"), so that the tray is received between a portion of the cart rear wall and a portion of the child-seat. The preferred size, thin shape and position of the tray, however, result in this position of the cart components placing moderate or little force on the tray and said force is not sufficient to damage the tray or to dislodge the tray relative to the handle. As a less-preferred alternative to the rigid tray, the tray may have some flexibility and resilience, so that said force may bend the platform portion to fit into the space SN between the nested rest wall 115 and child-seat back 124, for example. In either case, the tray 10 may be permanently installed on the cart 100, to remain on the cart during long-term use.

The preferred tray 10 is connected to the central portion of the handle, for example, only about the middle half of the handle length, with about ¼ of the handle length extending to the right and about ¼ of the handle length extending to the left out beyond the tray. This arrangement centers the tray 10 on the handle and centers the tray relative to the vertical longitudinal centerplane of the cart, which leaves the right and left portions of the handle uncovered and exposed, for grasping to drive/manipulate the cart. Except for the very small amount of the connection portion that may extend along the rear side of the handle, the tray preferably does not extend rearward of the handle 110 in the in-use or in the nesting configuration; the preferred tray may be described as extending less than 1 inch, more preferably less than ½ inch, and most preferably less than ¼ inch, rearward from the handle at all times.

As discussed above, the preferred tray is connected to and contacts only approximately the bottom half of the handle, for example the bottom 90-200 degrees, more preferably the bottom 135-200 degrees, or most preferably the bottom 135-180 degrees of the circumference of the handle, rather than the top half of the handle circumference. This results in the low-profile that is effective for holding the personal items without interference with the other functions of the cart. Alternatively, the tray may be fixedly connected to the top side and/or front or rear side of the handle, with the platform portion 12 still extending forward in such a way that it will be in space SN when the cart is in the nesting configuration. Examples of such a top-side connection are given in Provisional Application Ser. No. 62/165,036, and so are incorporated herein.

Figure 17:
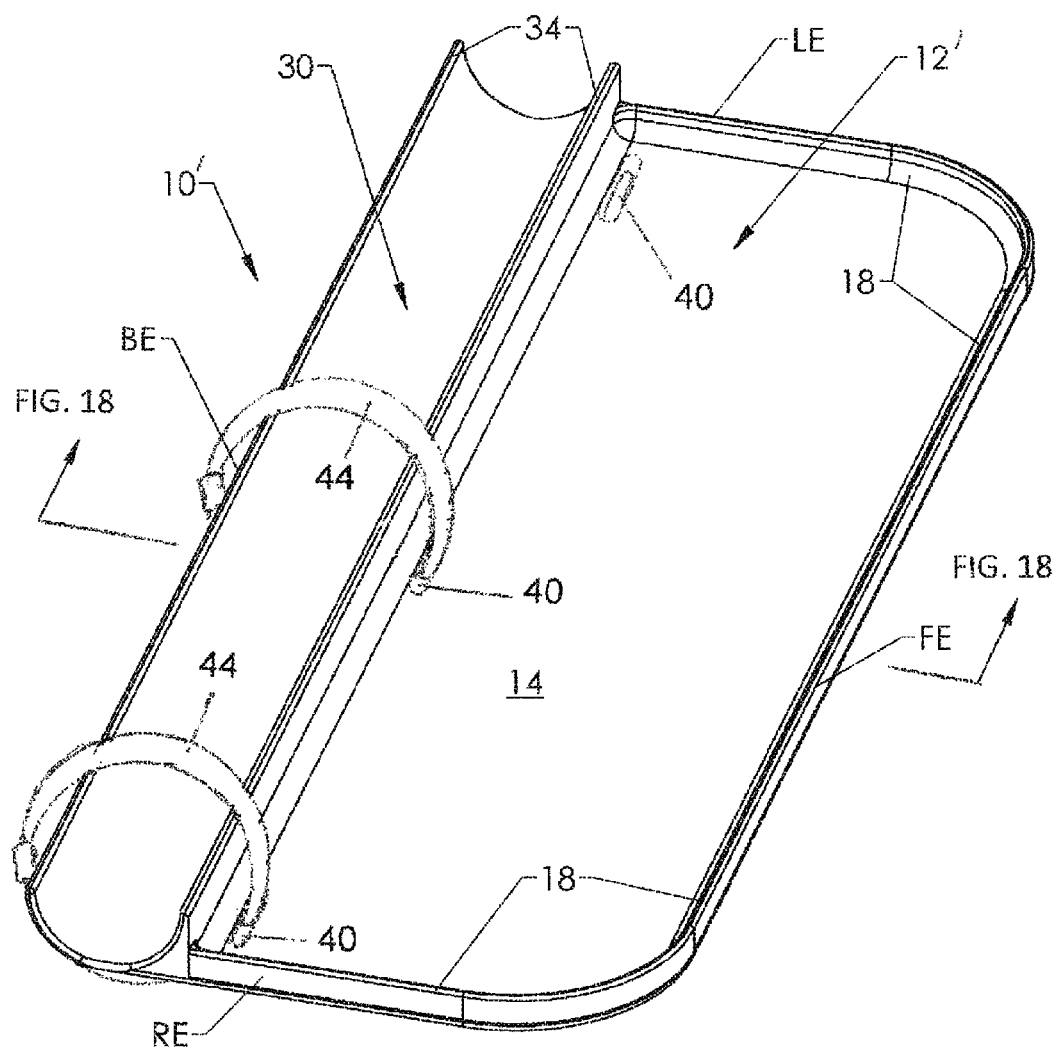
FIG. 17 is a top, right-end perspective view of an alternative embodiment of the invented accessory tray for a shopping cart, including apertures in the platform portion and ties for connection to a cart handle.
Figure 18:
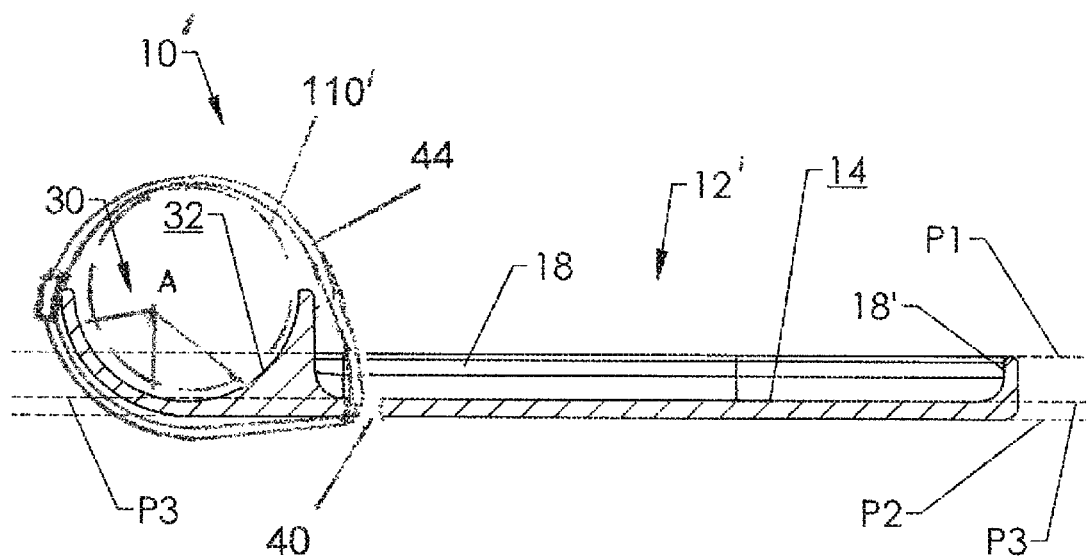
FIG. 18 is a schematic cross-sectional view of the tray of FIG. 17, viewed along line 18-18 in FIG. 17 and with a dashed-line cart handle added.

While the currently-preferred connection method is glue/adhesive, other fastening methods and means may be used in certain embodiments. For example, adhesive may be supplemented or replaced by ties, straps, screws, nuts and bolts, clips, pins, and/or other fasteners, in certain embodiments. FIGS. 17 and 18 illustrate an alternative tray 10' that includes multiple apertures 40 through the tray, in this embodiment, through platform portion 12'. The tray apertures receive ties 44, straps, or other fasteners that connect the connection portion 30 to a shopping cart handle. Ties 44 extend through the apertures 40, the tie ends are fastened together, and the ties are tightened around the connection portion 30 and around the circumference of the cart handle. Two ties 44 are shown in two apertures 40 in FIG. 17, and it will be understood from that a third tie 44 will preferably extend through the third aperture, and be tightened around the connection portion and the cart handle, so that the fixed connection is along all, or spaced along all, the length of the tray.

FIG. 18 shows a schematic cross-section of the tray 10', with handle 110' in dashed lines and tie 44 tightened about the rear portion of the platform portion 12', the connection portion 30, and the handle 110'. FIG. 18 shows a gap A for receiving adhesive between the inner surface 32 of the connection portion 30 and the outer surface of the handle 110'. Alternatively, no adhesive may be used, and the ties 44 or other fasteners would be the sole means of connecting the tray 10' to the handle 110'. In the no-adhesive case, there would be no gap A, or at least no gap along portions of surface 32, and surface 32 or portions of surface 32 would directly contact the handle 110'. Thus, in certain embodiments, zip-ties, buckle straps, snap-buckle straps, knotted cord, fastened wire, and/or other fasteners may be used in addition to, or instead of, adhesive.

Apertures 40 are one example of apertures extending all the way through the platform portion 12', from top to bottom, that may serve as drain holes for rain or other liquid that lands on the platform portion 12'. The draining function may be in addition to, or instead of, the apertures receiving ties or other fasteners. The preferred number of drain holes is 3-8, with the lower end of this range being preferred so that the platform portion strength and durability is not compromised. The preferred location of apertures 40 is along the rear of the top surface 14, as shown in FIGS. 17 and 18, because the preferred platform portion 12' and top surface 14 are expected to be slightly slanted relative to horizontal when installed on most cart handles. For example, platform portion 12' and top surface 14 may slant downward in the range of about 0.1-10 degrees, but more preferably 1-5 degrees, from the front to the rear of the top surface 14, wherein these ranges are included in the term "generally horizontal". This may result from installation on the handle giving the entire tray a slight slant, so that all of planes P1, P2, P3, and P4 are parallel to each other but all slanted downward, from front to rear, said 0.1-10 degrees or more preferred 1-5 degrees. Alternative drain aperture shapes, shapes, and numbers may be provided in certain embodiments.

Certain embodiments of the tray are integrally formed with the shopping cart, for example, integrally fixed to the handle during original manufacture of the cart. Certain embodiments may be integrally formed together with a handle grip and/or sleeve that is screwed onto, or otherwise fastened to the handle, for example, as understandable from handle grip G and fasteners F called-out in FIGS. 14 and 15.

Unless otherwise specified, these options are embodiments included in the phrase describing the tray or the connection of the tray being "fixed to the handle of the shopping cart".

While one style of shopping cart, and one style of cart handle, are portrayed in the Figures, it may be understood that alternative styles of carts and cart handles may cooperate with the preferred tray in certain embodiments. For example, the tray may be connected to, or extend integrally from, various cart handles, for example, those that are a single cylindrical bar rather than the more complex handle having the added handle grip G and fasteners F shown in the Figures. It will also be understood that the conventional shopping cart handle is the bar or other structure that is at or near the top rear of the cart, and is the structure that the user typically grasps for driving and maneuvering the cart while shopping.

Summary of Certain Embodiments

Certain embodiments of the tray may be described as: A tray for a shopping cart with a handle having an underside, the tray comprising, consisting essentially of, or consisting of: a connection portion; and a substantially planar platform portion having a rear side connected to the connection portion, the planar platform extending forward from the connection portion and having front, left, and right side, a planar top surface for receiving items placed by a user, and a rim upending around the planar top surface on the front, left and right sides; wherein the connection portion has a length parallel to the handle, and has a semi-cylindrical surface extending along all or substantially all of said length, for being fixed to the underside of the handle. "Substantially all of said length" may be along 51-99 percent, or more preferably 60-99 percent, or most preferably 80-99 percent of the length, because greater surface area and length of the fixed connection will translate to a greater secure and durable connection and greater immovability of the tray. Such a tray preferably features the planar top surface being substantially or entirely continuous and flat and/or with no recesses and no upending compartment walls that divide the planar top surface into compartments. The semi-cylindrical surface of the connection portion may extend circumferentially 90-200 degrees, or 170-190 degrees, for example.

Certain embodiments of the invention may be described as: a combination of a shopping cart and an accessory tray on the shopping cart, the shopping cart comprising a handle at an upper rear end of the cart, a rear wall having an upper end that is forward of the handle and an opposing lower portion, wherein there is a handle space between the handle and the rear wall upper end and a child-seat portion having a seat flap and a child-seat back with an upper end, wherein, in an in-use configuration for the cart, the rear wall is generally vertical and the seat flap is generally horizontal and the child-seat back is generally vertical forward of the seat flap; the tray comprising, consisting essentially of, or consisting of: a connection portion fixed to the handle of the shopping cart; and a substantially planar platform portion having a rear side connected to the connection portion, a front side, a left side, and a right side, a planar top surface for receiving items placed by a user, and optionally but preferably a rim upending around the planar top surface on multiple of the front, left and right sides; wherein the platform portion extends forward from the connection portion across said handle space to place the front side of the platform portion generally over the upper end of the rear wall so that said tray does not extend over said seat flap; and wherein, in a nesting configuration of the cart, the rear wall pivots to move the rear wall lower portion forward, and the child-seat back pivots rearward so that said rear wall and the back are generally parallel and generally horizontal and there is a storage space between the upper end of the rear wall and the upper end of the child-seat back, the front side of the tray platform portion being received in said storage space. The tray of such a combination preferably does not move relative to the handle when the shopping cart moves from the in-use configuration to the nesting configuration. The connection portion has a length parallel to the handle, and may have a semi-cylindrical surface extending along all or substantially all of said length, for being fixed to an underside of the handle. The planar top surface may be continuous and flat, with optional small drain apertures, and/or have recesses in the planar top surface and no upending compartment walls that divide the planar top surface into compartments. The connection portion has a length parallel to the handle, and may have a semi-cylindrical surface extending along all or substantially all of said length, for being fixed to an underside of the handle, and wherein said semi-cylindrical surface extends circumferentially 90-200 degrees, or circumferentially 170-190 degrees, for example. In such a combination, the tray platform portion may rests on said upper end of the rear wall, for example, when the cart is in the in-use configuration and also when the cart is in the nesting configuration. It is preferred that the tray be immovable relative to the handle, but certain embodiments may have slight flexibility, with resilience, especially or only in the platform portion. The handle of the shopping cart may be generally cylindrical and have a bottom half and a top half, wherein the tray does not contact said top half, and/or wherein the tray does not extend above said top half, and/or wherein the tray does not extend above a horizontal plane that passes through said handle top extremity. The tray may be fixed to the bottom half of the handle, and the platform portion may extend forward from the bottom half of the handle.

Certain embodiments are methods of installing a tray as described herein on a shopping cart, and using the shopping cart and/or transforming the shopping cart between the in-use configuration and the nesting configuration, wherein the tray stays in place, preferably un-moved relative to the handle of the cart, in both configurations. This is possible because the size, shape and design of the tray and its connection or integral-fixing is such that the tray is not in the way of moving parts and is not forced to move or forced loose by said nesting. The tray fits between the nested components of the cart, specifically, the pivoting rear wall and the pivoting child-seat components that move relative to each other for said nesting. This allows a manufacturer, grocery, or other business to install the trays, or order carts with the trays, a single time and they will typically remain in place trouble-free for long use of both the cart and the tray. Customers will enjoy the convenience of the simple, minimal-parts, slim/thin profile tray installed in a low-profile orientation on the cart. Customers will enjoy the convenience, safety, and the small "footprint" of the tray, while being able to rest their important and/or shopping-related personal items on the tray for easy access through the shopping experience.

Although this invention has been described above with reference to particular means, materials and embodiments, it is to be understood that the invention is not limited to these disclosed particulars, but extends instead to all equivalents within the scope of the following claims.

I claim:

1. A combination of a shopping cart and an accessory tray on the shopping cart, the shopping cart comprising:

a handle at an upper rear end of the cart, a rear wall having an upper end that is forward of the handle and an opposing lower portion, wherein there is a handle space between the handle and the rear wall upper end and a child-seat portion having a seat flap and a child-seat back with an upper end, wherein, in an in-use configuration for the cart, the rear wall is generally vertical and the seat flap is generally horizontal and the child-seat back is generally vertical forward of the seat flap; and the tray comprising a connection portion fixed to the handle of the shopping cart; and a substantially planar platform portion having a rear side connected to the connection portion, a front side, a left side, and a right side, and a planar top surface for receiving items placed by a user;

wherein the platform portion extends forward from the connection portion across said handle space to place the front side of the platform portion generally over the upper end of the rear wall so that said tray does not extend over said seat flap;

wherein, in a nesting configuration of the cart, the rear wall pivots to move the rear wall lower portion forward, and the child-seat back pivots rearward so that said rear wall and the back are generally parallel and generally horizontal and there is a storage space between the upper end of the rear wall and the upper end of the child-seat back, the front side of the tray platform portion being received in said storage space; and wherein the handle has a top extremity, and the tray does not extend above a horizontal plane that passes through said handle top extremity.

2. The combination of claim 1, wherein the tray does not move relative to the handle when the shopping cart moves from the in-use configuration to the nesting configuration.

3. The combination of claim 1, wherein the connection portion has a length parallel to the handle, and has a semi-cylindrical surface extending along all or substantially all of said length, for being fixed to an underside of the handle.

4. The combination of claim 1 wherein the planar top surface is substantially continuous and flat.

5. The combination of claim 1 wherein the tray has no recesses in the planar top surface and no upending compartment walls that divide the planar top surface into compartments.

6. The combination of claim 1, wherein the tray has a rim upending around the planar top surface on multiple of the front, left and right sides.

7. The combination of claim 1 wherein the connection portion has a length parallel to the handle, and has a semi-cylindrical surface extending along all or substantially all of said length, for being fixed to an underside of the handle, and wherein said semi-cylindrical surface extends circumferentially 90-200 degrees.

8. The combination of claim 1 wherein the connection portion has a length parallel to the handle, and has a semi-cylindrical surface extending along all or substantially all of said length, for being fixed to an underside of the handle, and wherein said semi-cylindrical surface extends circumferentially 170-190 degrees.

9. The combination of claim 1, wherein the tray platform portion rests on said upper end of the rear wall.

10. The combination of claim 1, wherein the tray platform portion rests on said upper end of the rear wall when the cart is in the in-use configuration and in the nesting configuration.

11. The combination of claim 1, wherein the tray is immovable relative to the handle.

12. The combination of claim 1, wherein the handle is generally cylindrical and has a bottom half and a top half and the tray does not contact said top half.

13. The combination of claim 1, wherein the handle is generally cylindrical and has a bottom half and a top half and the tray does not extend above said top half.

14. The combination of claim 1, wherein handle has a top half and bottom half, the tray is fixed to the bottom half of the handle, and the platform portion extends forward from the bottom half of the handle.

* * * * *